Aug. 10, 1954  J. WULFF  2,686,117
METHOD FOR PREPARING REFRACTORY METAL CARBIDE
Filed July 15, 1952
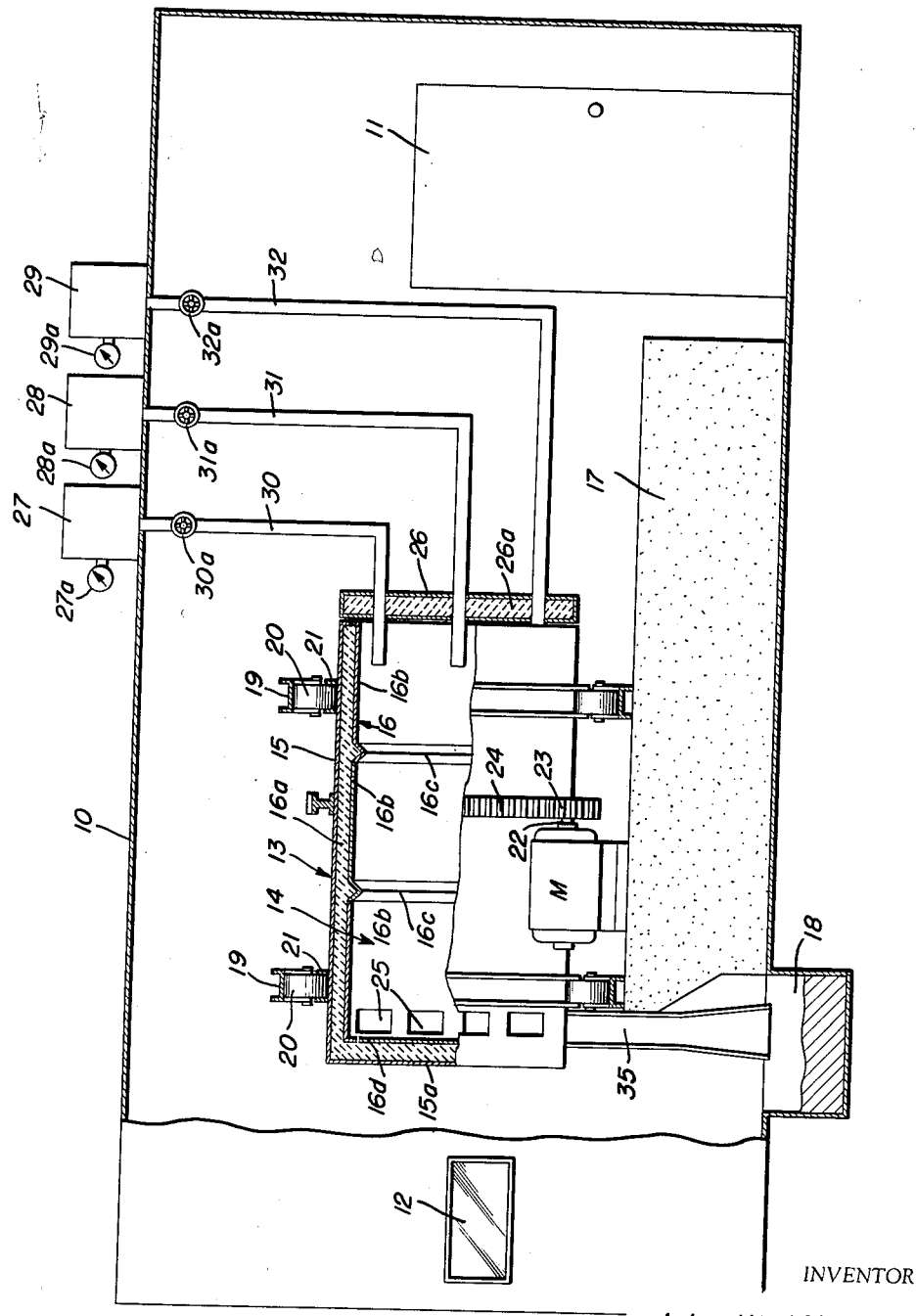
INVENTOR
John Wulff
BY John B. Armentraut
ATTORNEY Patented Aug. 10, 1954

2,686,117

UNITED STATES PATENT OFFICE 2,686,117

METHOD FOR PREPARING REFRACTORY METAL CARBIDE

John Wulff, Cambridge, Mass.

Application July 15, 1952, Serial No. 298,956

14 Claims. (Cl. 75—203)

This invention relates to the production of refractory metal carbide and more particularly to the production of metal carbide compositions and products.

An object of my invention is the provision of a simple, practical and reliable method for producing refractory metal carbide compositions and products in which metal carbide particles are in a cementing or bonding medium.

Another object of my invention is that of providing an expeditious and relatively inexpensive method for producing high density cemented refractory metal carbide bodies.

A further object of this invention is the provision of a rapid and highly satisfactory method for producing cemented metal carbide, comprising carbide of one or more metals such as titanium, zirconium, chromium, molybdenum, columbium, tungsten, tantalum, and vanadium, cemented by a substance having a relatively low melting point.

A still further object of my invention is the provision of a method in which refractory metal carbide particles are substantially simultaneously produced and cemented to highly dense form.

Other objects of my invention in part will be obvious and in part pointed out more fully hereinafter.

The invention accordingly consists in the combination of elements, composition of materials and features of products, and in the several steps and the relation of each of the same to one or more of the others, as described herein, the scope of the appreciation of which is indicated in the following claims.

The single figure of the accompanying drawing somewhat schematically represents a centrifugal reaction unit and related equipment, to provide an example of apparatus for carrying out several of the possible ways in which my invention may be realized.

As conducive to a clearer understanding of certain features of my invention, it may be noted at this point that cemented refractory metal carbide products heretofore have been produced for example by mixing in a ball mill, or the like, carbide powder of one or more refractory metals and a powdered lower melting point cementing or bonding metal such as nickel, cobalt or iron. The mixed powders thereafter have been pressed to a wide variety of shapes usually in molds under hydraulic pressure, this being followed by one or more sintering operations, as for example in a furnace or furnaces having a nonoxidizing atmosphere, to densify and achieve cementing of the pressed body.

It will be appreciated, too, that the refractory metal carbide powder in the cemented body usually has been made under conditions involving the mixing together of several finely divided solids giving a batch-type mixture which is to be heated in a separate operation. In this connection, one of the well known methods includes first producing powder of the refractory metal which is to be altered to carbide and then intimately mixing this powder with carbon in the form of lamp black. The mixture thereafter is heated as a batch in a non-oxidizing atmosphere to temperatures high enough for carbon absorption to occur. After continued heating, the refractory metal powder becomes carburized, giving for example a sponge-like carbide product of the refractory metal which then usually is subjected to crushing, thus producing free particles of carbide powder for subsequent use with a cementing agent.

The production of cemented refractory metal carbide thus heretofore has involved not only time consuming steps going to the production of refractory metal carbide powder, but has involved such isolated steps as mixing this powder with a cementing metal powder and pressing and sintering the mixture.

An outstanding object of my invention is the provision of a simple, direct, and thoroughly practical method for producing cemented refractory metal carbide bodies.

Referring now more particularly to the practice of my invention, I produce cemented or bonded refractory metal carbide by continuously feeding, intermingling and exothermically reacting halide of one or more refractory metals such as titanium, zirconium, chromium, molybdenum, columbium, tungsten, tantalum, vanadium, or the like and a reducing agent for the halide, and by dispersing carbon and cementing metal such as one or more metals of the group consisting of nickel, cobalt and iron, in the zone of the exothermic reaction, all with the exothermic reaction being maintained under substantially closed conditions excluding oxygen. The exothermic reaction produces refractory metal and halide of the reducing agent, but at the reaction temperatures the refractory metal immediately absorbs the carbon and takes the form of fine solid carbide particles. Also, by having the cementing metal dispersed in the reaction zone, the carbide particles become wetted or approximately so by a cementing substance including the cementing metal. It is believed that the cementing substance is either the cementing metal itself or an eutectic comprising the cementing metal and carbide of the refractory metal. Both the carbide particles and the cementing substance pass to a zone of deposition adjacent to the exothermic reaction and I immediately subject these particles and the cementing substance which is liquid or near liquid to a centrifugal compacting action to densify the deposit under the same substantially closed conditions as the exothermic reaction. At the temperatures of operation, the halide of the reducing agent is in fluid condition, and preferably passes off as a gas from the carbide and cementing material being deposited. In this connection, the refractory metal carbide and cementing substance preferably are hot enough to maintain a vaporous condition of the reducing agent halide so as to expel the same. With or without this particular expelling action, however, the hot carbide and cementing substance in being centrifugally compacted, are effective for squeezing out fluid halide of the reducing agent and thus expel the same whether this halide should be present as liquid or vapor or both.

A few of the cemented refractory metal carbides which I produce in accordance with my invention are cemented carbide of any one of the refractory metals titanium, zirconium, chromium, molybdenum, columbium, tungsten, tantalum, vanadium, or the like, the cementing substance including for example any one or more of the metals of the group consisting of nickel, cobalt, and iron. In accordance with materials introduced, I sometimes produce complex cemented carbide wherein the carbides of two or more metals of the group of refractory metals just named are cemented by a cementing substance of the character just mentioned. Some of the complex carbide compositions which I produce in accordance with the present invention are compositions which include both titanium carbide and vanadium carbide, compositions including titanium carbide and molybdenum carbide, compositions including titanium carbide, vanadium carbide and carbide of chromium, and compositions including titanium carbide and tungsten carbide.

The refractory metal halide which I exothermically react with a reducing agent in accordance with my invention thus may include one or more of many possible halides to achieve the carbide products desired, and among these halides are one or more compounds such as titanium tetrachloride, titanium tetraiodide, titanium tetrafluoride, zirconium tetrachloride, zirconium tetrabromide, zirconium tetraiodide, chromium chloride, tantalum pentachloride, tantalum pentabromide, tantalum pentafluoride, columbium pentachloride, columbium pentafluoride, vanadium tetrachloride, vanadium pentafluoride, molybdenum tetrabromide, molybdenum pentachloride, molybdenum hexafluoride, tungsten pentachloride, tungsten pentabromide and tungsten hexafluoride. Among the materials which I employ for reducing agent in the exothermic reaction are one or more metals such as magnesium, sodium, calcium, lithium, strontium and barium. Of these, magnesium, sodium and calcium of course are the more abundant and accordingly are more often used. A reducing agent which includes magnesium, now is preferred.

The carbon which is dispersed in the exothermic reaction zone, illustratively is initially in the form of one or more hydrocarbons such as anthracene, naphthalene, pyrene, phenyl-naphthalene or acetylene which I continuously introduce to the reaction at the same time as the refractory metal halide and the reducing agent for the halide. The hydrocarbon at the exothermic reaction temperatures and by reason of being dispersed in the reaction zone yields carbon which immediately carburizes the refractory metal given off by the exothermic reaction. The hydrogen component of the hydrocarbon illustratively is expelled from the carbide and cementing material being deposited, as in the form of hydrogen gas such as immediately after breakdown of the hydrocarbon or after assisting the reducing agent to reduce the refractory metal halide, thus producing hydrogen halide, the latter for example then being reduced by amounts of the reducing agent present to give hydrogen and halide of the reducing agent.

Sometimes I use such sources of carbon as carbon tetrachloride by dispersing this chloride in the reaction zone along with the other reactants. In utilizing carbon tetrachloride in lieu of a hydrocarbon, however, more reducing agent is called for, considering that both the halide source of the refractory metal and the halide source of carbon are reduced in the exothermic reaction. There are occasions where I provide dispersed carbon in the reaction zone by introducing colloidal carbon such as well known lamp black to this zone, illustratively by injecting the carbon using as a carrier a supply of protective gas for the reaction. In fact, I subject the hot refractory metal coming from the exothermic reaction to carbonization in any one or more of a number of many possible ways. The above will serve to illustrate a few of these which at present are preferred.

To achieve the exothermic reaction, I prefer to preheat the refractory metal halide and the other materials which are to be introduced to the reaction zone and then continuously feed these materials at proper temperatures into the reaction chamber of a substantially closed centrifugal receptacle and thus sustain the exothermic reaction. Certain of the refractory metal halides which I employ are so volatile as to be gaseous as the result of the preheating while others remain solid or liquid on being preheated for introduction. Usually, I preheat the reducing agent to anywhere from a liquid to gaseous condition and then continuously introduce this agent to the reaction zone. In certain instances, the reducing agent conveniently serves as a carrier for the cementing metal and both are introduced in this way to intermingle with the refractory metal halide in the reaction zone. Thus, for example, in utilizing magnesium to reduce the refractory metal halide, I sometimes introduce a magnesium alloy in which either or both nickel and cobalt are present in accordance with the cementing metal desired. Magnesium and iron illustratively do not alloy, but iron has a highly volatile chloride, $FeCl_3$, which, for example, I often use for a source of iron in my process along with magnesium or other reducing agent. Sometimes I feed the cementing agent in powder form to the reaction zone by continuous feed or even in the form of wire which is continuously advanced to the reaction zone and melted such as to the point of being vaporous by the heat of the reaction.

To exclude oxygen from the reaction zone and zone of deposition in my process, I often conduct the exothermic reaction in a protective atmosphere such as of helium or argon, one or more of these inert gases for example being continuously injected into the reaction chamber, so as to blanket the reaction zone and zone of deposition. I sometimes rely upon injection of the protective gas and/or one or more of the reactants in gaseous condition, such as gaseous refractory metal halide or gaseous reducing agent for this halide, to purge the reaction chamber in initiating my process or to exclude oxygen during continued operation of the process. Once the exothermic reaction has begun, halide of the reducing agent becomes available in quantities and if gaseous, as preferred, conveniently maintains pressure for escaping from the chamber. The gaseous halide of the reducing agent often is used under these conditions to exclude oxygen from the reaction and zone of deposition without the use of argon or helium.

The temperatures of the materials entering the reaction chamber influence the temperature of the exothermic reaction, and also the quantities of reactants brought together considerably affect the reaction temperature. The quantities of carbon and cementing metal entering the reaction zone affect the make-up of the refractory metal carbide and cementing substance deposited. I therefore prefer to control the temperatures of the materials entering the reaction chamber and the quantities of these materials introduced to each other. In this connection I usually bring the materials together in the reaction zone in desired quantities at controlled temperatures of preheat. The temperatures of preheat and quantities introduced preferably sustain the exothermic reaction at temperatures high enough for the reaction to give a continuously forming deposit of fine solid refractory metal carbide particles and liquid or near liquid cementing substance at the wall of the centrifugal receptacle which is rotating and produces a centrifugal compacting force integrating and densifying the deposit. The centrifugal integration of the deposit preferably is achieved at an angular velocity or rotational speed which produces a highly dense centrifugally integrated cemented refractory metal carbide body. I prefer to keep the amount of carbon in the process within the range of absorption and thus avoid the presence of free carbon in the deposit.

A fluid condition or near fluid condition of the cementing substance is conducive to more effective elimination of the reducing agent halide from the standpoint that the high heat represented serves to maintain this halide in a more fluid condition, and from the standpoint that the refractory metal carbide and cementing substance deposited are more readily compacted and united squeezing out this halide by the centrifugal action.

The cemented refractory metal carbide which I obtain in accordance with my invention, illustratively is in the form of high density bars, rods, liners, thin-wall cylinders such as for rolls, engines or brakedrums; coatings, facings, claddings integral with underneath metal or other material which is clad, tubes, armor-penetrating projectiles, nozzles, turbine blades, tools as for example abrading or cutting implements, dies, gauge blocks, or any of a host of other high density products such as to perform functions wherein any properties such as hardness, wear resistance, heat resistance, or a variety of properties are desired.

In many instances the refractory metal carbide and cementing substance which I deposit from the zone of the exothermic reaction is subjected to the centrifugal compacting operation in a mold inside the receptable wall for building up the deposit to highly dense substantially final shape and size of the product being produced. There are occasions where I directly deposit the carbide and cementing substances onto an object or objects which are to be clad, faced or the like, such as by disposing one or more of the objects in the zone of deposition directly to receive the deposit from the reaction zone while the centrifugal compacting operation is being achieved for densification. Sometimes in this connection I preheat the objects by any suitable means to a bonding temperature so as to receive the deposit and form a bond with the object. There are instances where the object which I clad, line, coat, or the like, serves to house the exothermic reaction and affords the wall on which deposition and centrifugal compacting occur.

Where, as preferred, the exothermic reaction chamber has good heat dissipating properties at its walls, as for example by the walls being positively cooled as from the outside by water spray, heat exchange fins, or the like, the deposit inside the chamber walls collects, is centrifugally compacted, and the cementing substance between the solid carbide particles becomes quite solid. This gives a substantially solid underlayer of the cemented refractory metal carbide while additional amounts of solid particles of refractory metal carbide and liquid or near liquid cementing substance deposit from the reaction and are compacted and cool to increase the thickness of the carbide body. With this arrangement, the high temperature of the exothermic reaction, the high temperature products coming from the reaction zone for making the cemented body, and the high temperature centrifugal compacting operation applied all are confined within a receptacle which may have relatively low temperature properties without being destroyed by the high internal temperatures.

In certain instances the cemented refractory metal carbide which I produce is cyanocarbide, that is, a mixture of carbide and nitride. To achieve a highly dense, cemented cyanocarbide deposit, I proceed as in the manner hereinbefore described, and disperse nitrogen such as a pure grade of nitrogen gas or ammonia gas in the exothermic reaction zone along with the other materials introduced. Under these conditions the exothermic reaction produces refractory metal and halide of the reducing agent and the refractory metal not only immediately absorbs carbon but nitrogen and takes the form of fine solid cyanocarbide particles. By having a cementing metal dispersed in the reaction zone, and by sustaining the exothermic reaction at high enough temperatures, the cyanocarbide particles become wetted or approximately so by a cementing substance including the cementing metal, and these products are centrifugally compacted to a highly dense integral condition. The cementing substance in this instance is believed either to be the cementing metal itself or an eutectic comprising the cementing metal and cyanocarbide of the refractory metal. When employing ammonia to supply nitrogen, the hydrogen in the ammonia supplements the reducing effect of the reducing agent on the refractory metal halide, producing the refractory metal and nitrogen. Sometimes I rely upon the use of nitrogen gas or ammonia gas to purge the reaction chamber of oxygen before initiating the exothermic reaction. There are occasions too where I use nitrogen or ammonia in lieu of or in partial replacement of such gases as argon, helium, hydrogen, hydrocarbon, or the like, to exclude oxygen from the exothermic reaction and zone of deposition.

In an illustrative embodiment of my invention, I produce cemented titanium carbide by exothermically reacting titanium tetrachloride and magnesium metal in the presence of anthracene and nickel. For achieving the reaction and centrifugal compacting of titanium carbide and cementing substance including nickel coming from the reaction, a room 10 for example is provided (see the accompanying drawing), such as having a floor, walls and ceiling all of steel, a steel door 11 for access and glass-covered peep holes 12, through the walls for viewing the interior of the room from the outside. This room houses a centrifugal machine 13 in which the exothermic reaction and centrifugal compacting operations are to occur illustratively to produce cylinders of the cemented carbide. Room 10 is sealed to contain an atmosphere such as of helium or argon to protect the reaction and materials deposited, against the effects of oxygen.

The centrifugal reaction machine 13 illustratively includes a reaction receptacle or drum 14 having an outer cylindrical shell 15 as of steel lined on the inside with refractory material 16 which preferably is graphite. The graphite lining 16 preferably is separated from the shell 15 by a layer of refractory insulation 16a such as zirconia or magnesia, this to afford better protection of the steel shell from the heat of the reaction and to facilitate removal of the lining. Lining 16 conveniently includes a plurality of abutting rings 16b which have annular lips 16c at one end thereof with these lips projecting inward an amount approximating the thickness of the cemented carbide cylinders which are to be produced, and with the lips spaced apart by an amount approximating the desired lengths of the cylinders.

The reaction drum 10 has a base 17 as of concrete and for example is supported to this base in a longitudinally inclined position toward a halide receiving pit 18 in the floor of room 10. Mounted on top the base 17 are spaced annular rings 19 which carry anti-friction rollers 20 in rolling contact with the outside surface of cylindrical shell 15. In this connection, shell 15 illustratively has short flanges 21 projecting outwardly therefrom at the ends of the rollers 20. A rotary drive shaft 22 is connected in driven reaction with driving means, such as an electric motor M. This drive shaft for example carries a drive pinion 23 affixed thereto and the pinion meshes with a driven ring 24 or the like connected to the shell, so that the electric motor M or other driving means may rotate the drum 14 at a sufficient speed for compacting the titanium carbide and cementing substance on the refractory lining 16.

At the lower end, reaction drum 14 illustratively is closed by an extension 15a of the shell 15 and the extension has a lining 16d such as of the same material as the lining 16. Around the periphery of the rotary reaction drum 14 in the vicinity of the lower end thereof are spaced outlet ports 25 through lining 16 and shell 15 from the interior of the drum and disposed above pit 18. The opposite or upper end of drum 14 is substantially closed by a removable closure head 26 supported against rotation with the drum by the base 17, the head being so dimensioned that in the closing position it clears the adjacent end of the drum, leaving the latter free for rotation. Head 26 advantageously has a refractory lining 26a on that portion of the surface thereof which is exposed to the inside of the drum 14.

On the outside of room 10 and mounted on top the room are heating units 27, 28, and 29 such as of electric resistance, high frequency induction or electric arc type. In the heating units 27 and 28 respectively I introduce titanium tetrachloride and anthracene and preheat each of these, and in heating unit 29 I prepare a melt of magnesium-nickel alloy and preheat this.

In preparing the centrifugal reaction unit 13 for operation, I close head 26 onto the corresponding end of rotary drum 14. The room 10 also is closed and is purged of oxygen such as by feeding in from suitable supply helium or argon which for example has a restricted outlet from the room so as to be continuously replaced by fresh gas from the source of supply. Sometimes instead of the helium or argon I fill the room with a hydrocarbon gas, hydrogen or other satisfactory gas and rely upon this to exclude oxygen. Still further in preparing for initiation of the exothermic reaction, I prefer to subject the graphite lining to preheat such as by means of an electric arc, resistance heater or high frequency induction heater to expel gases from the graphite which otherwise may afford a source of contamination for the deposit. Motor M is started preferably before the reaction is initiated and the motor brings the drum 14 to desired centrifugal compacting speed of rotation. The preheating units 27, 28, and 29 are set as by means of rheostats 27a, 28a, and 29a to maintain their respective contents ready for introduction into the reaction zone of drum 14. Ducts 30, 31, and 32 lead from the heating units 27, 28, and 29 into drum 14 through end head 26 and illustratively have control valves 30a, 31a, and 32a for controlling the quantities of materials introduced from these heating units to the reaction zone.

I usually preheat these materials to at least about 800° C. and continuously feed the materials so heated to the reaction zone. Under these conditions the titanium tetrachloride and anthracene are each in a vaporous condition and the magnesium-nickel alloy is in a fluid condition at the points of entering the reaction zone. When heated by the exothermic reaction upon entering the reaction zone, the magnesium-nickel alloy may be a liquid or a vapor depending upon the particular temperatures of preheat and heat of reaction employed. Usually I feed the materials at temperatures of about 800° C. to about 1000° C. or more in the ducts 30, 31, and 32, and then rely upon the heat of the exothermic reaction to increase these temperatures such as by radiation and conduction. An exothermic reaction continuously ensues in which the titanium tetrachloride is principally reduced by the magnesium giving titanium metal and magnesium chloride. The anthracene, too, has a reducing effect on the titanium tetrachloride, and liberates carbon which immediately carburizes the available titanium in the reaction zone to produce solid titanium carbide particles. In continuously introducing the reactants to the reaction zone I prefer to control the amounts of each so as to sustain the reaction at high enough temperatures for a liquid or near liquid cementing substance including the nickel present to come off with the titanium carbide particles and deposit with these particles to the graphite lining 16 of the rotating drum 14 and for the magnesium chloride coming from the reaction to be in a vaporous condition. The deposited titanium carbide and nickel cementing substance are compacted by the centrifugal force of the rotating drum 14. The deposit receives more titanium carbide particles and cementing substance from the exothermic reaction and this additional material likewise is centrifugally compacted. The material first deposited, preferably becomes relatively cool and becomes solid while the thickness increases with continued supply from the exothermic reaction. For this purpose, the wall of the centrifugal drum 14 advantageously has good heat dissipating properties. I sometimes increase the cooling effect achieved, by positively cooling the drum 14 such as by water spray applied externally to the drum.

The materials continuously introduced to the inside of drum 14 preferably fill the drum at a sufficient pressure to drive off the gaseous magnesium chloride which for example condenses at escape ports 25 and passes as liquid illustratively down a baffle 35 to the collecting pit 18. When the gaseous magnesium chloride comes in contact with the titanium carbide and nickel cementing substance deposited in the drum 14, the deposit in being centrifugally compacted exerts a squeezing action which serves to expel the gas and for that matter by this same squeezing action expels liquid magnesium chloride should liquid be present such as because of condensation. By having the drum 14 longitudinally inclined toward pit 18 the expelled liquid passes from the drum through ports 25 and down baffle 35 to the pit.

In this manner, for example, a highly dense cemented titanium carbide deposit is gradually built up on the lining 16 of the rotating drum 14. When the deposit attains suitable thickness, I discontinue the supply of materials from the preheating units 27, 28, and 29 and stop the motor M. Head 26 is moved away from the corresponding end of drum 14 to give access to the cemented titanium carbide. In the present instance, I separate the deposit at points adjacent to the annular lips 16c of the graphite lining 16 and then remove the annular segments 16b of the lining from the end of the drum. Following this, I strip each segment 16b from the corresponding portion of the cemented titanium deposit which it supports and accordingly free a cylinder of the cemented carbide in each instance. The cemented carbide cylinders illustratively are used for brake drums, liners for internal combustion engines, or for any of a wide variety of other purposes.

My process thus enables the direct production of highly dense cemented refractory metal carbide through the use of an exothermic reaction. The reactants are injected at relatively low temperatures but at a rate preferably so controlled as to sustain the control at high temperature reaction. The exothermic reaction takes place under substantially closed conditions excluding oxygen and the constituents for the cemented refractory metal carbide are made available and are centrifugally compacted under the same substantially closed conditions while the reaction is ensuing.

Thus it will be seen that with this invention, the various objects hereinbefore noted together with many thoroughly practical advantages are successfully achieved. It will be seen that the process is simple, direct and is readily used to produce highly dense cemented refractory metal carbide of any of a variety of different grades.

While my process affords many advantages when used to produce highly dense cemented refractory metal carbide bodies, it will be understood that on occasions certain of these advantages still are realized from my process by modifying the working conditions thereof, and especially by lowering the temperatures in and around the exothermic reaction, to the point of obtaining refractory metal carbide bodies of sponge grade as the resulting product in the exothermic reaction chamber; this practice still being in accordance with the present invention. I sometimes reheat this sponge and press and shape it to dense cemented condition of the carbide particles.

As many possible embodiments of this invention may be provided and as many possible changes may be made in the embodiments hereinbefore set forth, it will be distinctly understood that all matter described herein is to be interpreted as illustrative and not as a limitation.

I claim:

1. In the production of a cemented refractory metal carbide body, the art which includes, continuously feeding refractory metal halide and a reducing agent for said halide to exothermic reaction in a reaction zone and continuously providing a dispersion of carbon and cementing metal in said zone, all under substantially closed conditions excluding oxygen and continuously reducing said refractory metal halide at temperatures producing solid refractory metal carbide particles, anywhere from fluid to near fluid cementing substance including said cementing metal, and fluid halide of the reducing agent, and immediately centrifugally compacting said refractory metal carbide particles and the cementing substance under said substantially closed conditions and expelling fluid halide of the reducing agent from said particles and substance.

2. In the production of a cemented refractory metal carbide body, the art which includes continuously feeding refractory metal halide and a reducing metal for said halide alloyed with cementing metal to exothermic reaction in a reaction zone and continuously providing a dispersion of carbon in said zone, all under substantially closed conditions excluding oxygen and continuously reducing said refractory metal halide at temperatures producing solid refractory metal carbide particles, anywhere from fluid to near fluid cementing substance including said cementing metal, and fluid halide of the reducing metal, and immediately centrifugally compacting said refractory metal carbide particles and the cementing substance under said substantially closed conditions and expelling fluid halide of the reducing agent from said particles and substance.

3. In the production of a cemented refractory metal carbide body, the art which includes, continuously feeding refractory metal halide, reducing metal for said halide, and a hydrocarbon source of carbon to exothermic reaction in a reaction zone and continuously providing a dispersion of cementing metal in said zone all under substantially closed conditions excluding oxygen and continuously reducing said refractory metal halide at temperatures producing solid refractory metal carbide particles, anywhere from fluid to near fluid cementing substance including said cementing metal, and fluid halide of the reducing metal, and immediately centrifugally compacting said refractory metal carbide particles and the cementing substance under said substantially closed conditions and expelling fluid halide of the reducing metal from said particles and substance.

4. In the production of a cemented refractory metal carbide body, the art which includes, continuously feeding refractory metal halide and a reducing agent for the same to exothermic reaction in a reaction zone and continuously providing a dispersion of carbon in said zone all under substantially closed conditions excluding oxygen and continuously reducing said refractory metal halide and cementing metal halide at temperatures producing solid refractory metal carbide particles, anywhere from fluid to near fluid cementing substance including said cementing metal, and fluid halide of said reducing agent, and immediately centrifugally compacting said refractory metal carbide particles and the cementing substance under said substantially closed conditions and expelling said fluid halide of the reducing agent from said particles and substance.

5. In the production of a cemented refractory metal carbide body, the art which includes, continuously feeding refractory metal halide, carbon tetrachloride and reducing metal for said halides to exothermic reaction in a reaction zone and continuously providing a dispersion of cementing metal in said zone, all under substantially closed conditions excluding oxygen and continuously reducing said refractory metal halide and carbon tetrachloride at temperatures producing solid carbide particles of said refractory metal, anywhere from fluid to near fluid cementing substance including said cementing metal, and fluid halide of the reducing metal, and immediately centrifugally compacting said refractory metal carbide particles and the cementing substance under said substantially closed conditions and expelling fluid halide of the reducing agent from said particles and substance.

6. In the production of a cemented refractory metal carbide body, the art which includes, continuously feeding refractory metal halide and reducing metal for said halide to exothermic reaction in a reaction zone and continuously providing a dispersion of cementing metal in said zone and blowing in colloidal carbon, all under substantially closed conditions excluding oxygen and continuously reducing said refractory metal halide at temperatures producing solid carbide particles of said refractory metal, anywhere from fluid to near fluid cementing substance including said cementing metal, and fluid halide of the reducing metal, and immediately centrifugally compacting said refractory metal carbide particles and the cementing substance under said substantially closed conditions and expelling fluid halide of the reducing agent from said particles and substance.

7. In the production of a cemented refractory metal carbide body, the art which includes feeding refractory metal halide and a reducing metal comprising at least one metal of the group consisting of magnesium, calcium, and sodium to exothermic reaction in a reaction zone and continuously providing a dispersion of carbon and cementing metal comprising at least one metal of the group consisting of nickel, cobalt and iron in said zone, all under substantially closed conditions excluding oxygen and continuously reducing said refractory metal halide at temperatures producing solid refractory metal carbide particles, anywhere from liquid to near liquid cementing substance including said cementing metal, and fluid halide of the reducing metal, and immediately centrifugally compacting said refractory metal carbide particles and the cementing substance under said substantially closed conditions and expelling fluid halide of the reducing metal from said particles and substance.

8. In the production of a cemented refractory metal carbide body, the art which includes, continuously feeding halide of at least one refractory metal of the group consisting of titanium, zirconium, chromium, molybdenum, colombium, tungsten, tantalum and vanadium and reducing metal to exothermic reaction in a reaction zone and continuously providing a dispersion of carbon and cementing metal in said zone all under substantially closed conditions excluding oxygen and continuously reducing said refractory metal halide at temperatures producing solid carbide particles of said refractory metal, anywhere from liquid to near liquid cementing substance including said cementing metal, and fluid halide of the reducing metal, and immediately centrifugally compacting said refractory metal carbide particles and the cementing substance under said substantially closed conditions and expelling fluid halide of the reducing metal from said particles and substance.

9. In the production of a cemented refractory metal carbide body, the art which includes, continuously feeding refractory metal halide, reducing metal comprising at least one metal of the group consisting of magnesium, calcium and sodium and alloyed with cementing metal comprising at least one metal of the group consisting of cobalt and nickel to exothermic reaction in a reaction zone and continuously providing a dispersion of carbon and cementing metal in said zone, all under substantially closed conditions excluding oxygen and continuously reducing said refractory metal halide at temperatures producing solid refractory metal carbide particles, anywhere from fluid to near fluid cementing substance including said cementing metal, and fluid halide of the reducing metal, and immediately centrifugally compacting said refractory metal carbide particles and the cementing substance under said substantially closed conditions and expelling fluid halide of the reducing metal from said particles and substance.

10. In the production of a cemented refractory metal carbide body, the art which includes continuously feeding refractory metal halide and magnesium to exothermic reaction in a reaction zone and continuously providing a dispersion of carbon and at least one cementing metal of the group consisting of nickel, cobalt and iron in said zone, all under substantially closed conditions excluding oxygen and continuously reducing said refractory metal halide at temperatures producing solid refractory metal carbide particles, anywhere from fluid to near fluid cementing substance including said cementing metal, and fluid magnesium halide, and immediately centrifugally compacting said refractory metal carbide particles and the cementing substance under said substantially closed conditions and expelling fluid magnesium halide from said particles and substance.

11. In the production of a cemented refractory metal carbide body, the art which includes, feeding refractory metal halide and a reducing agent for said halide to exothermic reaction in a reaction zone and continuously providing a dispersion of carbon and cementing metal in said zone all under substantially closed conditions excluding oxygen and continuously reducing said refractory metal halide at temperatures producing solid refractory metal carbide particles, fluid cementing substance including said cementing metal wetting said particles, and fluid halide of the reducing agent, and immediately centrifugally compacting said carbide particles and wetting substance under said substantially closed conditions and expelling fluid halide of the reducing agent from said particles and substance.

12. In the production of a cemented refractory metal carbide body, the art which includes, continuously feeding refractory metal halide and a reducing agent for said halide to exothermic reaction in a reaction zone and continuously providing a dispersion of carbon, nitrogen and cementing metal in said zone, all under substantially closed conditions excluding oxygen and continuously reducing said refractory metal halide at temperatures producing solid refractory metal cyanocarbide particles, anywhere from fluid to near fluid cementing substance including said cementing metal, and fluid halide of the reducing agent, and immediately centrifugally compacting said refractory metal cyanocarbide particles and cementing substance under said substantially closed conditions and expelling fluid halide of the reducing agent from said particles and substance.

13. In the production of a cemented refractory metal carbide body, the art which includes, separately preheating refractory metal halide and a reducing agent for said halide, continuously feeding the preheated materials to exothermic reaction in the reaction zone of a chamber having a rotating heat dissipating wall and continuously providing a dispersion of carbon and cementing metal in the reaction zone of said chamber, all under substantially closed conditions excluding oxygen and continuously reducing said refractory metal halide at temperatures producing deposits of solid refractory metal carbide particles and anywhere from liquid to near liquid cementing substance including said cementing metal to the rotating wall of said chamber, and simultaneously with said exothermic reaction centrifugally compacting the refractory metal carbides and cementing substance by the rotation of said heat dissipating wall gradually cooling the deposit.

14. In the production of a cemented refractory metal carbide body, the art which includes, separately preheating refractory metal halide and a reducing agent for said halide, continuously feeding the preheated materials to exothermic reaction in the reaction zone of a chamber having a rotating wall and continuously providing a dispersion of carbon and cementing metal in the reaction zone of said chamber, all under substantially closed conditions excluding oxygen and continuously reducing said refractory metal halide at temperatures producing deposits of solid refractory metal carbide particles and anywhere from liquid to near liquid cementing substance including said cementing metal to said rotating wall and fluid halide of the reducing agent, and simultaneously with said exothermic reaction centrifugally compacting said refractory metal carbide and cementing substance by the rotation of said wall and expelling said halide of the reducing agent from said chamber.

No references cited.